United States Patent
Sarkar (10) Patent No.: US 7,542,761 B2
(45) Date of Patent: Jun. 2, 2009

(54) VOICE QUALITY ON A COMMUNICATION LINK BASED ON CUSTOMER FEEDBACK

(75) Inventor: Falguni Sarkar, Redmond, WA (US)

(73) Assignee: AT&T Mobility II LLC, Redmond, WA (US)

(*) Notice: Subject to any disclaimer, the term of this patent is extended or adjusted under 35 U.S.C. 154(b) by 876 days.

(21) Appl. No.: 10/959,553

(22) Filed: Oct. 6, 2004

(65) Prior Publication Data

US 2006/0073786 A1 Apr. 6, 2006

(51) Int. Cl.
*H04Q 7/20* (2006.01)

(52) U.S. Cl. .................. 455/423; 455/425; 455/67.11; 455/69

(58) Field of Classification Search .......... 455/7, 455/24, 418, 420, 423, 432.3, 446, 452.2, 455/63.1, 517, 67.11, 423.425, 69, 456.1, 455/456.3, 67.13, 414.1–2, 456.5, 421, 425; 370/352, 356, 401; 379/221.01, 265.02, 379/265.06, 1.01, 1.04; 709/223, 221
See application file for complete search history.

(56) References Cited

U.S. PATENT DOCUMENTS

| | | | |
|---|---|---|---|
| 4,012,603 A | 3/1977 | Araseki et al. | |
| 4,757,495 A | 7/1988 | Decker et al. | |
| 5,471,650 A * | 11/1995 | Vexler et al. | 455/69 |
| 5,809,414 A * | 9/1998 | Coverdale et al. | 455/421 |
| 5,926,460 A * | 7/1999 | Jukl et al. | 370/241 |
| 5,940,439 A | 8/1999 | Kleider et al. | |
| 6,430,602 B1 | 8/2002 | Kay et al. | |
| 6,456,633 B1 | 9/2002 | Chen | |
| 6,484,196 B1 | 11/2002 | Maurille | |
| 6,501,834 B1 | 12/2002 | Milewski et al. | |
| 6,539,421 B1 | 3/2003 | Appelman et al. | |
| 6,549,937 B1 | 4/2003 | Auerbach et al. | |
| 6,574,216 B1 | 6/2003 | Farris et al. | |
| 6,614,781 B1 * | 9/2003 | Elliott et al. | 370/352 |
| 6,654,615 B1 | 11/2003 | Chow et al. | |
| 6,677,976 B2 | 1/2004 | Parker et al. | |
| 6,691,162 B1 | 2/2004 | Wick | |
| 6,707,890 B1 | 3/2004 | Gao et al. | |
| 6,731,323 B2 | 5/2004 | Doss et al. | |
| 6,738,615 B1 | 5/2004 | Chow et al. | |
| 2003/0023982 A1 * | 1/2003 | Lee et al. | 725/116 |
| 2003/0225583 A1 * | 12/2003 | Fisher et al. | 704/500 |
| 2004/0022237 A1 * | 2/2004 | Elliott et al. | 370/356 |
| 2004/0073641 A1 * | 4/2004 | Minhazuddin et al. | 709/223 |
| 2005/0239444 A1 * | 10/2005 | Shieh | 455/414.1 |

FOREIGN PATENT DOCUMENTS

| WO | WO 9823080 A2 * | 5/1998 |
|---|---|---|
| WO | WO 9834391 A2 * | 8/1998 |

* cited by examiner

*Primary Examiner*—John J Lee
(74) *Attorney, Agent, or Firm*—Amin, Turocy & Calvin, LLP (57) ABSTRACT

Architecture that facilitates initiation of a user feedback signal during a telephone call when perceiving reduced voice quality. In response to receiving the feedback signal, the telephone network performs a number of measurements on the system and related to the user device that can be analyzed to determine the problem, and potentially resolve the problem. The feedback signal can be initiated by any number of user input means, including selection of a key or combination of keys on a cell phone keypad that generate signals which can be interpreted by the telephone network as the feedback signal, e.g., a DTMF signal.

34 Claims, 10 Drawing Sheets

| CELL ID | SUBSCRIBER | GEO DATA | TIME | DEVICE DATA | ... |
|---|---|---|---|---|---|
| 1000 | SUBSCRIBER1 | L/L1 | TIME1 | DDATA1 | ... |
| 1002 | SUBSCRIBER2 | L/L2 | TIME2 | DDATA2 | ... |
| 1004 | SUBSCRIBER1 | L/L3 | TIME3 | DDATA3 | ... |
| 1008 | SUBSCRIBER3 | L/L4 | TIME4 | DDATA4 | ... |
| 1010 | SUBSCRIBER4 | L/L5 | TIME5 | DDATA5 | ... |
| 1012 | ⋮ | | | | |
| ⋮ | | | | | |

VOICE QUALITY ON A COMMUNICATION LINK BASED ON CUSTOMER FEEDBACK

TECHNICAL FIELD

This invention is related to voice communications systems, and more specifically, the management of voice quality over a communication link.

BACKGROUND OF THE INVENTION

Improving and maintaining good voice quality has always been a problem for voice communication carriers. Every wireless carrier faces the problem of delivering consistent, improved voice quality. All techniques for improving voice quality are aimed at improving core network performance by reducing latency, jitter, echo cancellation, and improving RF conditions by doing drive tests and measuring holes in the coverage map. These drive tests are expensive. There are various techniques for measuring voice Quality. For example, an intrusive method creates a call between a source and a destination, inserts a signal, and compares the signal received at the destination with that at the source. Perceptual Evaluation of Speech Quality (PESQ) is one of the methods that rely on this technique. Another subjective technique makes a live call, and lets a group of people involved in those calls rate the conversation on a scale of 1 to 5, for example. A score (e.g., Mean Opinion Score (MoS)) is then created out of the aggregate score. A third technique by the ITU (International Telecommunication Union) is an objective modeling tool (called the E-model) that is used to predict voice quality It takes into account bit-error rates (BER), terminal characteristics, characteristics of the codec used, latency, jitter, and many other parameters, to predict voice quality.

A mobile terminal (e.g., a cellular telephone) does not suddenly experience loss of the communication link; rather, its radio signal fades slowly as the user moves the terminal towards the hole (reduced coverage area). Thus, the user/subscriber is in the best position to help carriers improve their coverage by providing some sort of feedback to the carrier. This allows a carrier to identify problem areas affecting voice quality and establish an automated way of addressing it.

There remains an unmet need that allows a party to a call to provide feedback during the call as to the voice quality.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention disclosed and claimed herein, in one aspect thereof, comprises a mechanism whereby a party to a wireless telephone call can initiate a feedback signal during the call which indicates that the voice quality of the communication link is degraded.

In another aspect of the invention, in response to receiving the feedback signal, the telephone network performs a number of measurements on the system and related to the user device that can be analyzed to determine the problem, and potentially resolve the problem.

In yet another aspect thereof, the user feedback capability can be employed in a message-centric regime where a user of a messaging device perceives that the messaging communications link is degrading to a point that the user sends the feedback signal.

In still another aspect of the invention, the feedback signal is initiated by any number of user input means, including selection of a key or combination of keys on a cell phone keypad that generate signals which can be interpreted by the telephone network as the feedback signal, e.g., a DTMF signal.

To the accomplishment of the foregoing and related ends, certain illustrative aspects of the invention are described herein in connection with the following description and the annexed drawings. These aspects are indicative, however, of but a few of the various ways in which the principles of the invention may be employed and the invention is intended to include all such aspects and their equivalents. Other advantages and novel features of the invention may become apparent from the following detailed description of the invention when considered in conjunction with the drawings.

DETAILED DESCRIPTION OF THE INVENTION

The invention is now described with reference to the drawings, wherein like reference numerals are used to refer to like elements throughout. In the following description, for purposes of explanation, numerous specific details are set forth in order to provide a thorough understanding of the invention. It may be evident, however, that the invention may be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running in a mobile computing device and the mobile computing device can be a component. One or more components may reside within a process and/or thread of execution and a component may be localized on one computer and/or distributed between two or more computers.

Figure 1:
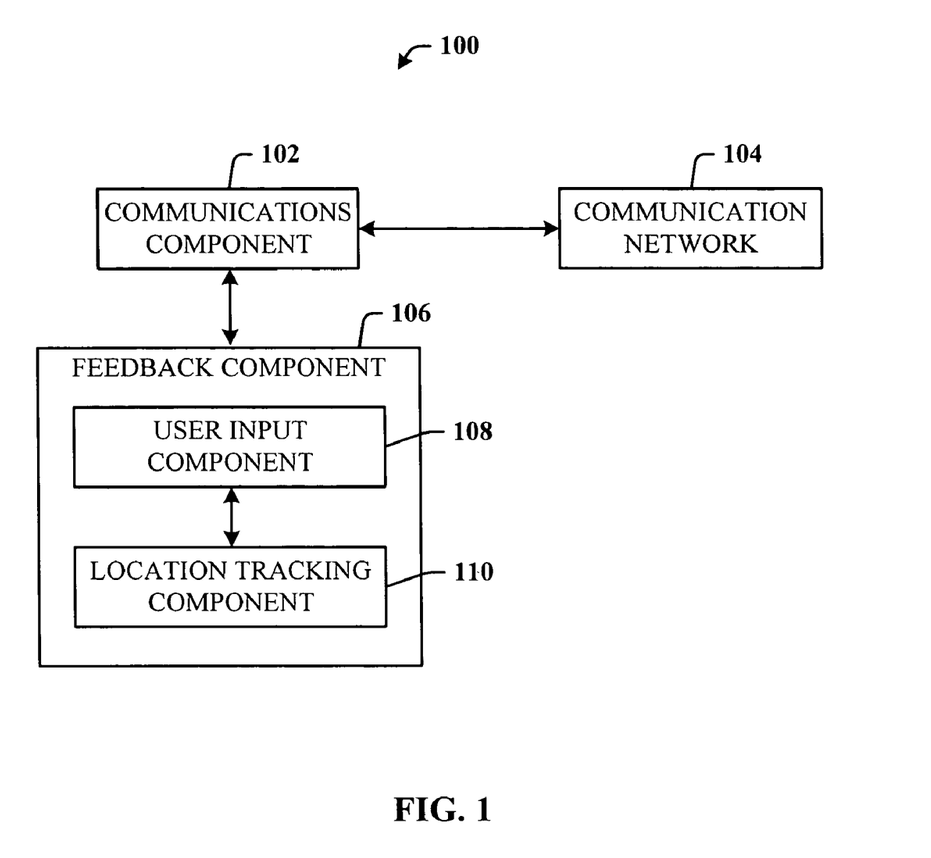
FIG. 1 illustrates a diagram of a system that facilitates user feedback during a telephone call in accordance with the subject invention.

Referring now to FIG. 1, there is illustrated a diagram of a system 100 that facilitates user feedback during a telephone call in accordance with the subject invention. The system 100 includes a communications component 102 that processes signals for transmission over a communications network 104. The communications component 102 can interface to the communications network in a wired and/or wireless manner. The system 100 also includes a feedback component 106 via which the user generates a user (or quality) feedback signal during the call. The feedback component 106 includes a user input component 108 that facilitates user input via, for example, a graphical user interface, in the form of input device interaction such as a mouse, keyboard, keypad, stylus pen, and optical pen, for example. Other input mechanisms can include voice activation, infrared signaling, and other signaling means generated according to a wired and/or wireless communication technology.

The feedback component 106 can also include a location tracking component 110 that facilitates the determination of the geographic location or point of origination of the user feedback signal. Such a technology can include GPS (Global Positioning System) or other geographic location determination technologies. It is to be appreciated that either or both of the user input component 108 and the location tracking component 110 can be located separate from the feedback component 106.

The communications component 102, feedback component 106, user input component 108 and location tracking component 110 can be incorporated into a portable wireless device, such as a cellular telephone (multimode, or otherwise), a voice-capable PDA (Personal Digital Assistant), and a conventional analog telephone that can be typically found in a residential home or business, for example.

In operation, a communication link is established such that, for example, a calling party can make a telephone call to a called party. The calling party, using a cellular telephone that employs the system 100, for example, can be talking to the called party, when either party notices the voice quality degrading. This can be for a number of reasons, one of which is that the calling party is moving towards a hole in cellular coverage (where only the calling party is moving), or for signal obstructions, system failures, etc.

When the calling party perceives the voice quality getting worse, he or she can press a key or combination of keys on the cell phone that initiates a user feedback signal that is transmitted from the calling party telephone. The single key or key combination (e.g., *9) generates corresponding DTMF (Dual-Tone Multi-Frequency) signals that can be interpreted as the user feedback signal to further initiate systems on the communications network 104 to react by recording information. The user feedback signal can be transmitted in-band (e.g., in the voice conversation, as well as in the signal and control information) and/or out-of-band (outside the voice channel in either/both of the voice channel or/and the control channel) so long as it can be received and processed in accordance with the invention. Any means of providing the user feedback signal can be employed as long as the means can be interpreted as the feedback signal by the telephone network.

The user feedback architecture of the subject invention need not be restricted to only the calling party providing the feedback. If the called party detects voice quality degradation, he or she can also provide the user feedback signal by pressing a key or key combination on their respective telephone that triggers associated systems on the network to measure and record system parameters related to the call. Thus, if the calling party is moving towards a coverage hole, and the called party perceives reduced voice quality, the calling party can initiate the feedback signal.

The architecture of the subject invention need not be restricted to only voice-centric devices. For example, if the user employs a portable messaging-centric device such as could be employed for Instant Messaging, SMS (Short Message Service), or the like, the portable device could provide an automatically-generated feedback signal to the messaging network if the messaging signal begins to degrade as the user moves geographically. For example, if a user is riding in a vehicle that is moving down the road, the messaging signal quality could degrade. When the messaging signal, as processed, reaches one or more predetermined quality parameters, the feedback signal is initiated.

Figure 2:
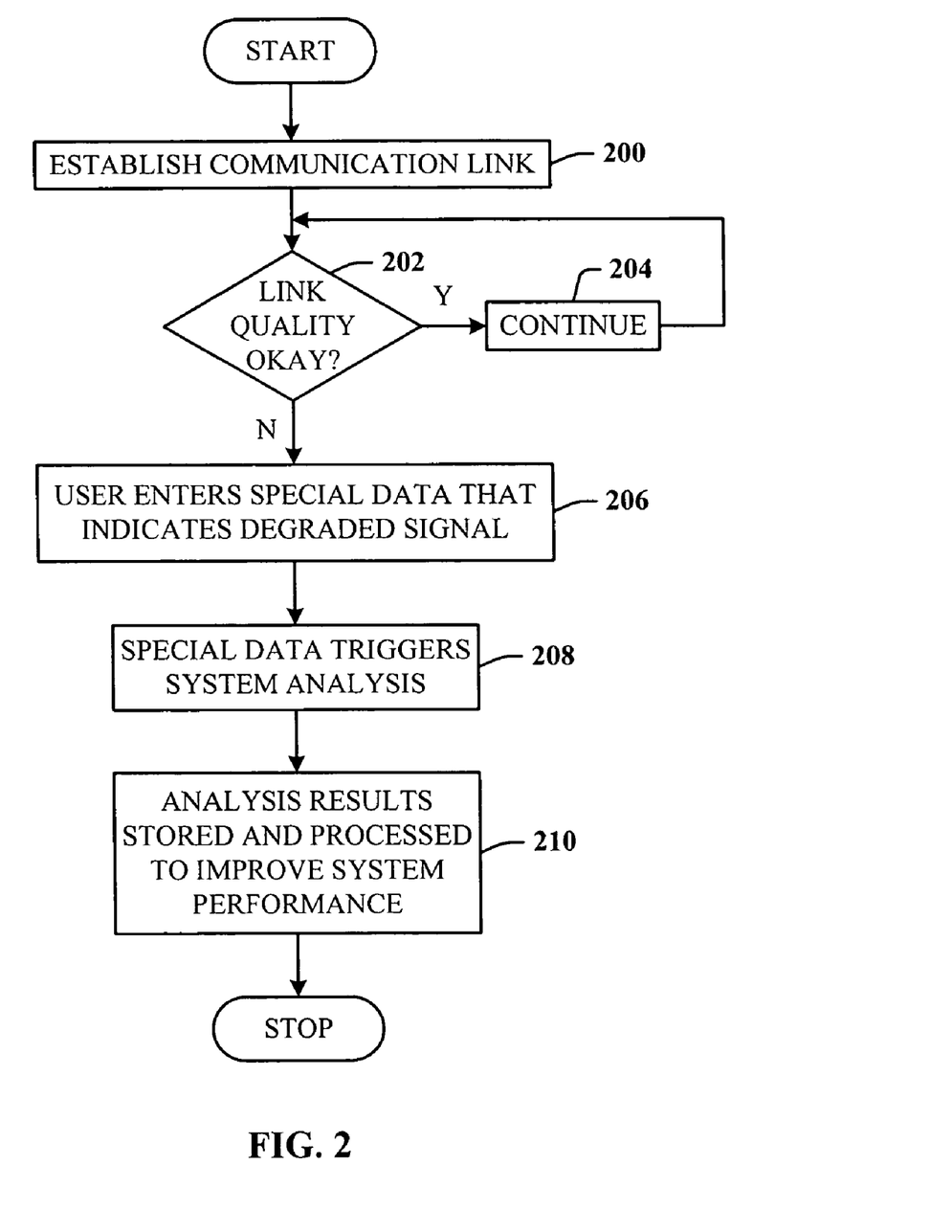
FIG. 2 illustrates a methodology of providing user feedback during an active communications link in accordance with the invention.

Referring now to FIG. 2, there is illustrated a methodology of providing user feedback during an active communications link in accordance with the invention. While, for purposes of simplicity of explanation, the one or more methodologies shown herein, e.g., in the form of a flow chart, are shown and described as a series of acts, it is to be understood and appreciated that the invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 200, an active communications link is established by a party. The term "active" in this context means that the user can interact with a destination node in anyway, such as by voice or manual entry of data, whether the destination node is another user or a system entity. At 202, a party to the link perceives the communications, and determines if the communications is degrading. If no, at 204, the party continues the communication, and flow is back to 202. If the party perceives that communications are degrading, at 206, the party provides user input that indicates that the degraded communications exists. Data input can be by many different means, for example, key entry, a combination of keys on a keypad or keyboard, voice entry where the voice signals are interpretable as indicating that communications is degrading, and other conventional input device means (e.g., mouse selection, stylus pen, and so on). At 208, the special data (or user input data) is received and processed to trigger system analysis of one or more system parameters associated with the communication. At 210, results are stored and processed to improve system performance. The process then reaches a Stop block.

Figure 3:
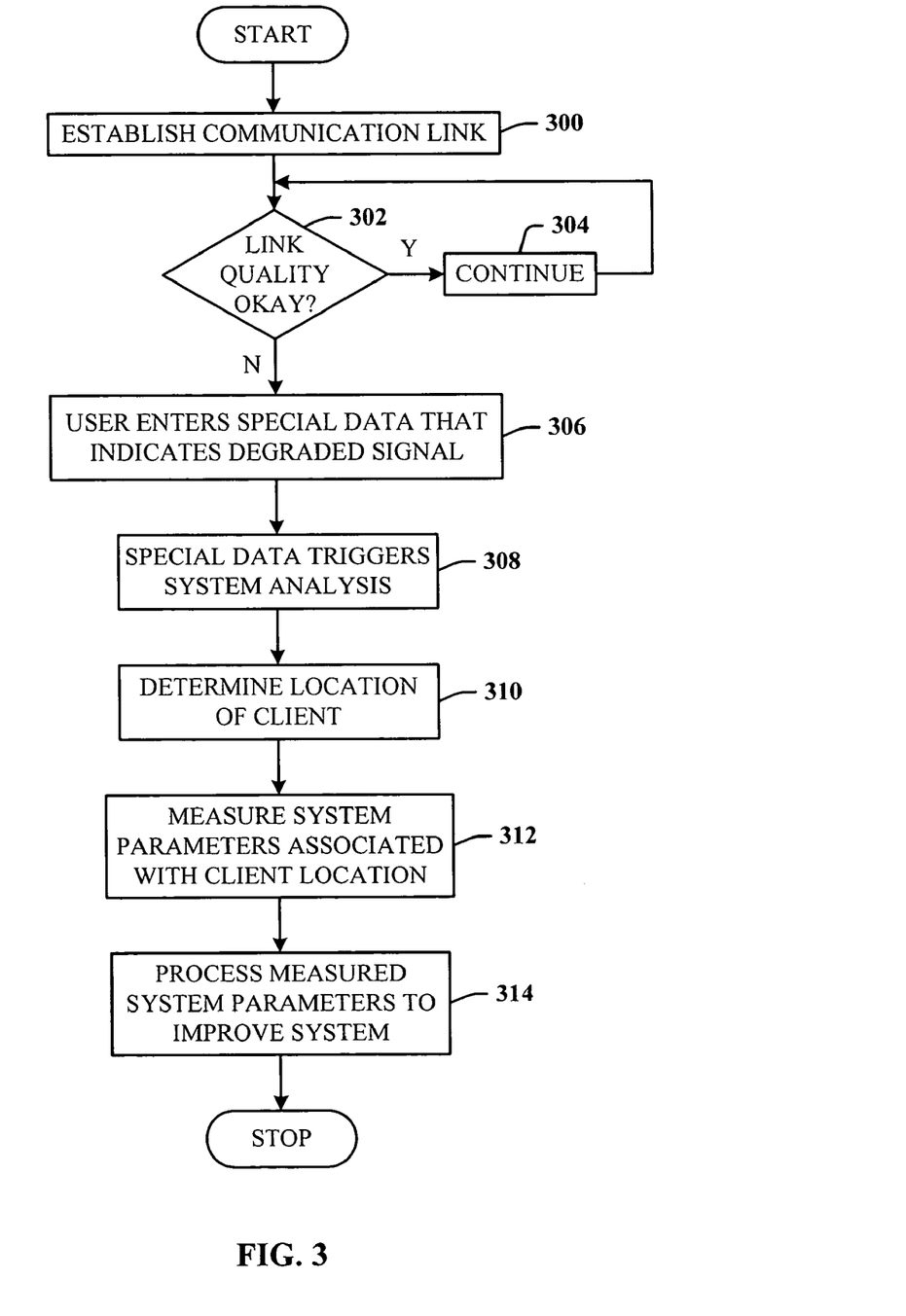
FIG. 3 illustrates a methodology of determining parameters related to geographic location of a device through which a user feedback signal is generated in accordance with the subject invention.

Referring now to FIG. 3, there is illustrated a methodology of determining parameters related to geographic location of a device through which a user feedback signal is generated in accordance with the subject invention. At 300, a communications link is established between at least one user and a communications system. Typically, the communications system further completes the link between at least one other user; however, this need not be the case. For example, returning to the example of a telephone call, the calling party can establish a dial tone to a system entity. This occurs by the user picking up a handset on, or turning on power on a portable phone. If the calling party is using a mobile telephone, and is moving toward a coverage hole, the dial tone signal can exhibit reduced or intermittent quality, providing an indication that the user feedback signal can be initiated.

Where the dial tone or voice quality of an established communications link is due to reduced battery functionality, the architecture of the subject invention can be programmed to detect this and either notify the user that the reduced quality is due to the battery, and thus, the user feedback signal is blocked, or simply block the user feedback signal. Alternatively, the feedback signal can be supplemented or include further information that indicates that the user feedback signal, when accompanied by this information, is not truly a system failure, but a user telephone problem that can be solved by the user replacing the batteries.

At 302, the user perceives communications over the communications link and decides if there is signal degradation. If not, flow is to 304, where communications continues, and then back to the input of 302. If the user perceives that the link exhibits signal degradation, at 306, the user initiates the user feedback signal by interacting with the user device to cause the feedback signal to be generated. At 308, the feedback signal is received and processed such that the communications system or entities thereof, begin analysis of one or more system parameters. At 310, the system initiates determination of the geographic location of the user device, or at least the geographic origin of the user feedback signal using the onboard location tracking component described in FIG. 1. At 312, the location information associated with the caller device is determined and stored. At 314, the stored location information is retrieved and processed to improve system performance. This will be described in more detail hereinbelow. The process then reaches a Stop block.

Figure 4:
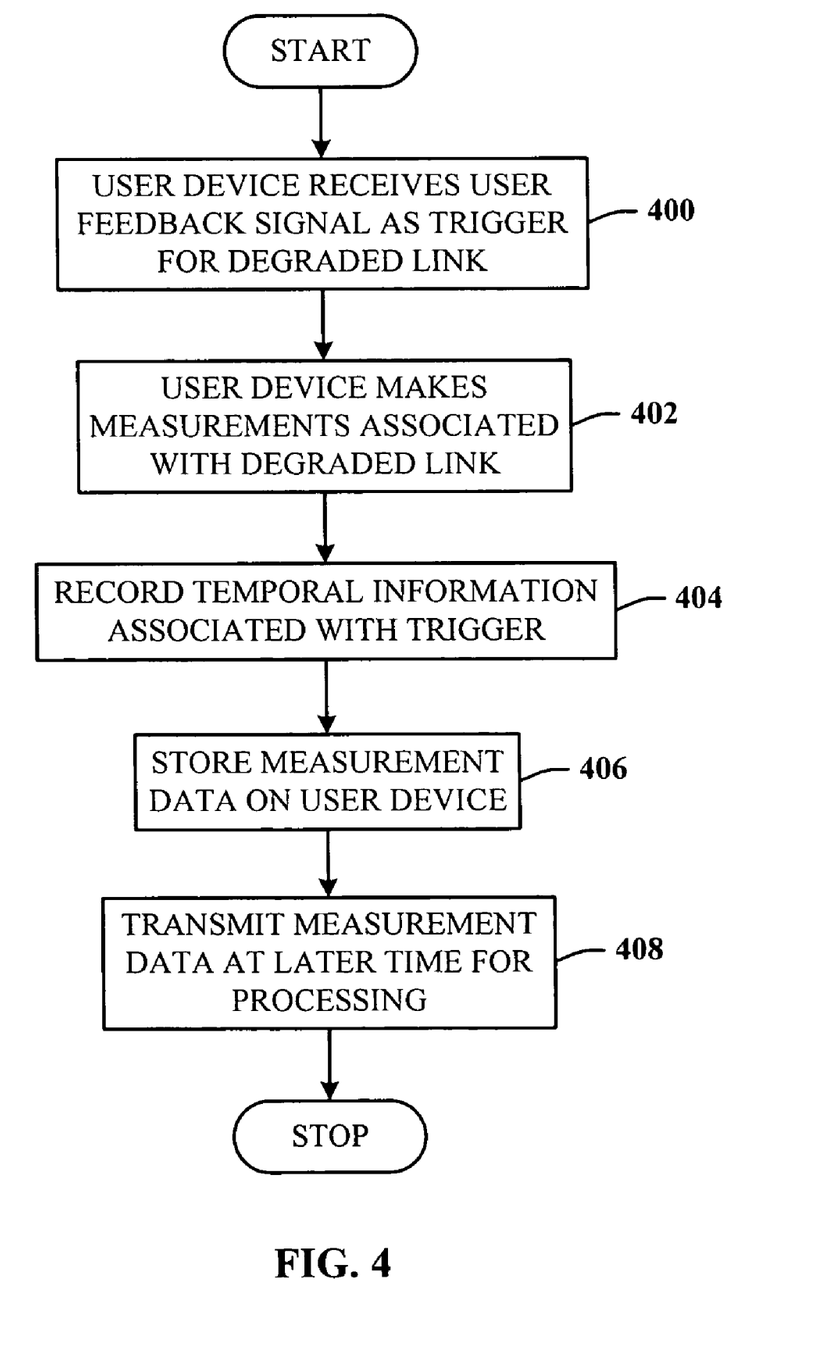
FIG. 4 illustrates a methodology of recording system parameters in the user communications device or location in response to processing of a user feedback signal in accordance with the invention.

Referring now to FIG. 4, there is illustrated a methodology of recording system parameters in the user communications device or location of the user device in response to processing of a user feedback signal in accordance with the invention. At 400, during an active communications link, the user provides the feedback signal that is processed by the user device as a trigger that the link is degraded. At 402, the user device performs measurements associated with the degrade link. At 404, one of the measurements recorded includes the temporal information such as the time the trigger was received. The time information can be recorded locally in the user device or remotely by the communication network system, since the system can be made aware that the triggering user feedback signal was provided. At 406, the measurements are stored locally in the user device. At 408, the measurement data is transmitted to a remote location on the network for processing, using the temporal data to more precisely analyze the measurements to resolve network and/or user device problems. The process then reaches a Stop block.

Figure 5:
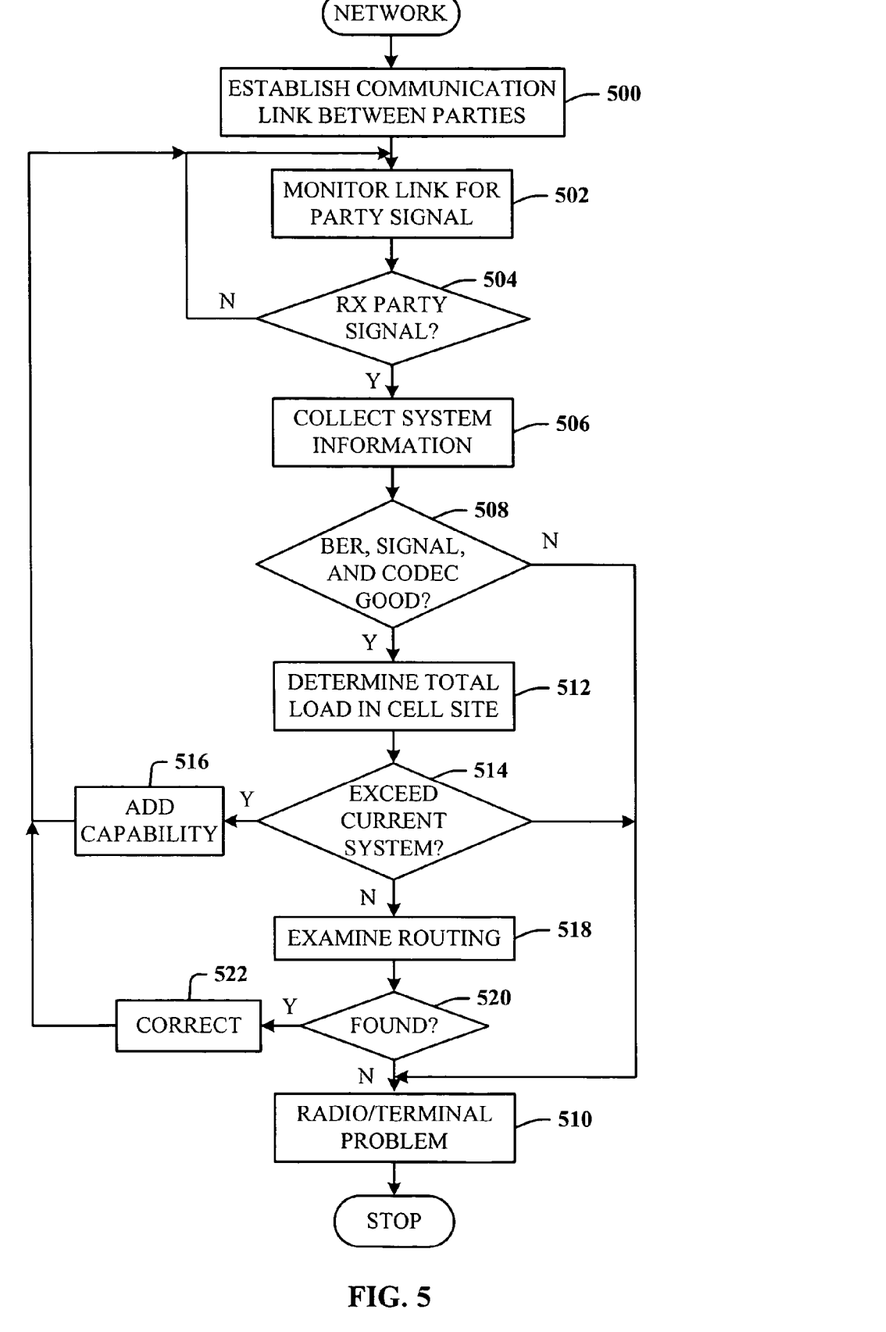
FIG. 5 illustrates a methodology of system analysis from a perspective of the network related to degradation of the communications link, in accordance with the subject invention.

Referring now to FIG. 5, there is illustrated a methodology of system analysis from a perspective of the network related to degradation of the communications link, in accordance with the subject invention. At 500, an active communications link is established. At 502, the network monitors the link for a user feedback signal. At 504, the network determines if a feedback signal has been received. If not, flow is back to the 502 to continue monitoring the link. If a feedback signal has been detected, flow is from 504 to 506 to begin collecting system (or network) information. The collected information can be stored on the network, and can include the approximate geographic location of the user device when the feedback signal was initiated by determining the longitude and latitude, the current cell site identification information, the time the feedback signal was received, caller number, and called number.

The link signal strength, BER (bit-error-rate), and CODEC (coder/decoder, hereinafter as codec) used (e.g., from the BSC/OMC-R (Base Station Transceiver/Operations and Maintenance Center-Radio)) can also be determined. (The OMC-R manages and monitors the radio interface under GSM (Global System for Mobile Communications), including the BSS (Base Station System), BSC (Base Station Controller), and BTS (Base Station Transceiver).) Additional information collected can be related to VoIP (Voice over IP) traffic (e.g., packet loss), LD (Long Distance) carrier, LEC (Local Carrier Exchange), ILEC (incumbent LEC), and CLEC (Competitive LEC). User device information such as device type and related information can be obtained from a device database (or HLR-Home Location Register).

At 508, the network checks if at least one of the BER, the signal quality, and codec that is being used is not functioning properly. If one or more of the BER, codec used, and signal quality are not acceptable, flow is to 510, where the problem is determined to exist in the user device (or radio/terminal). If the BER, signal quality, and codec used are determined to be good, flow is from 508 to 512, to determine the total load on the cell site in which the user device is operating. At 514, a check is made to determine if the current system capabilities have been exceeded. If yes, at 516, equipment can is added automatically or manually to meet the additional network demands. Flow is then back to 502.

On the other hand, if the total load on the cell site has not exceeded the network capabilities, flow is from 514 to 518, to examine routing capabilities. This includes more thorough examination of the whether VoIP was utilized, the LD carried for a long distance call, information related to who are the CLEC and ILEC, and the number of codec conversions made during the call, for example. At 520, a check is made to determine of any problems were found. If yes, at 522, operations are performed to address and resolve the problem, and flow is back to 502. If no problems are found, the problem is determined to be related to the user device, as indicated at 510. The process then reaches a Stop block.

Figure 6:
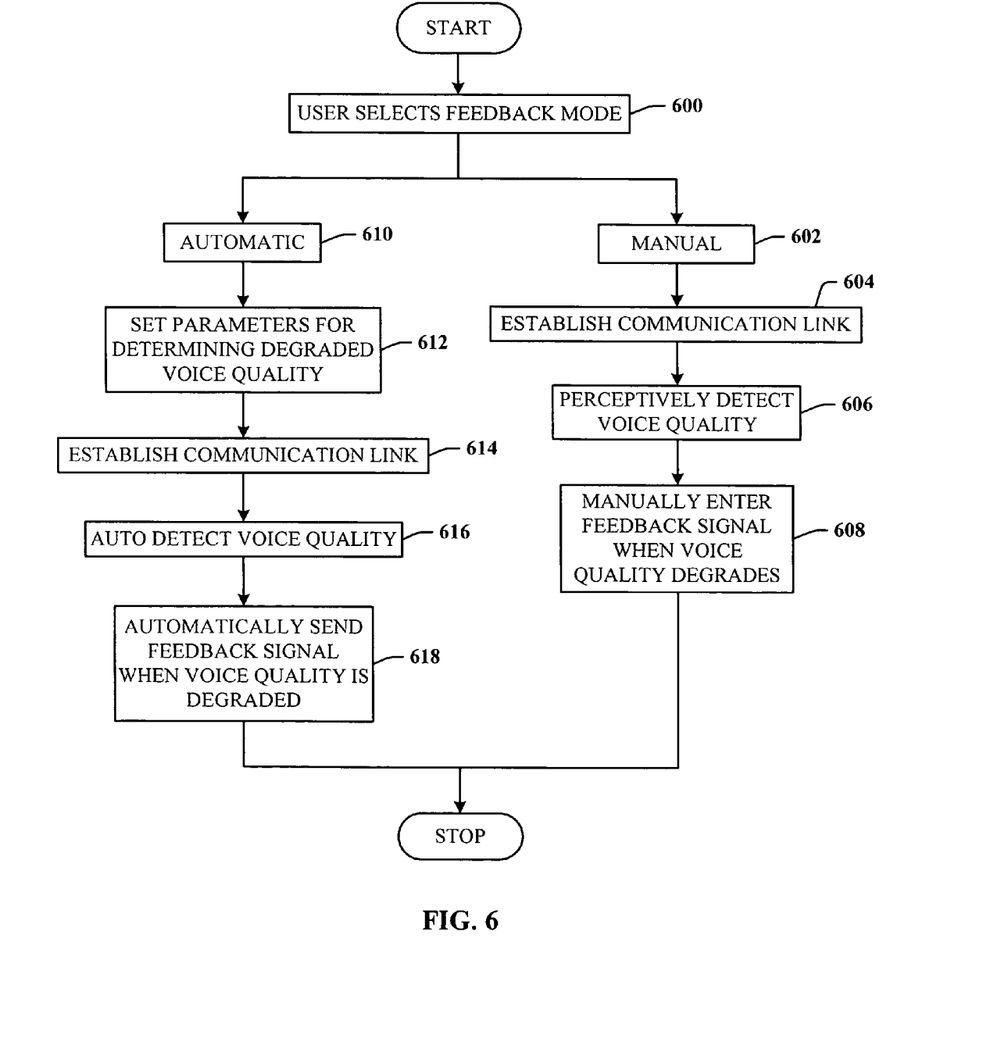
FIG. 6 illustrates a flow diagram of a methodology for user selection between an automatic mode and manual mode of operation to initiate a user feedback signal in accordance with the invention.

Referring now to FIG. 6, a flow diagram illustrates a methodology for user selection between an automatic mode and manual mode of operation to initiate a user feedback signal in accordance with the invention. At 600, the user is provided with means on a portable wireless device to make a selection between manual mode and automatic mode. At 602, the user selects manual mode. This can be via a user interface that is presented to the user by a menuing system of the user device. The user can set this mode before the communication link is established. At 604, the user interacts to have the communications link actively established. At 606, the user or any party to the communication can perceive voice quality of the link. At 608, the quality feedback signal is initiated. In manual mode, the user, or any party to a telephone call that has access to the feedback architecture of the present invention, can in initiate the feedback signal. The process then reaches a Stop block.

In an optimization of the subject invention, the user is allowed to select automatic mode, as indicated at 610. In conjunction with selection of this mode, the user can further provide input as to the criteria used for automatically determining when the link is exhibiting degraded voice quality, as indicated at 612. At 614, the user interacts to establish the communications link. At 616, the user device detects degraded voice quality in the link. At 618, when the user device detects that the link begins to degrade, and meets the criteria, the user device automatically generates the quality feedback signal for transmission to the network.

Figure 7:
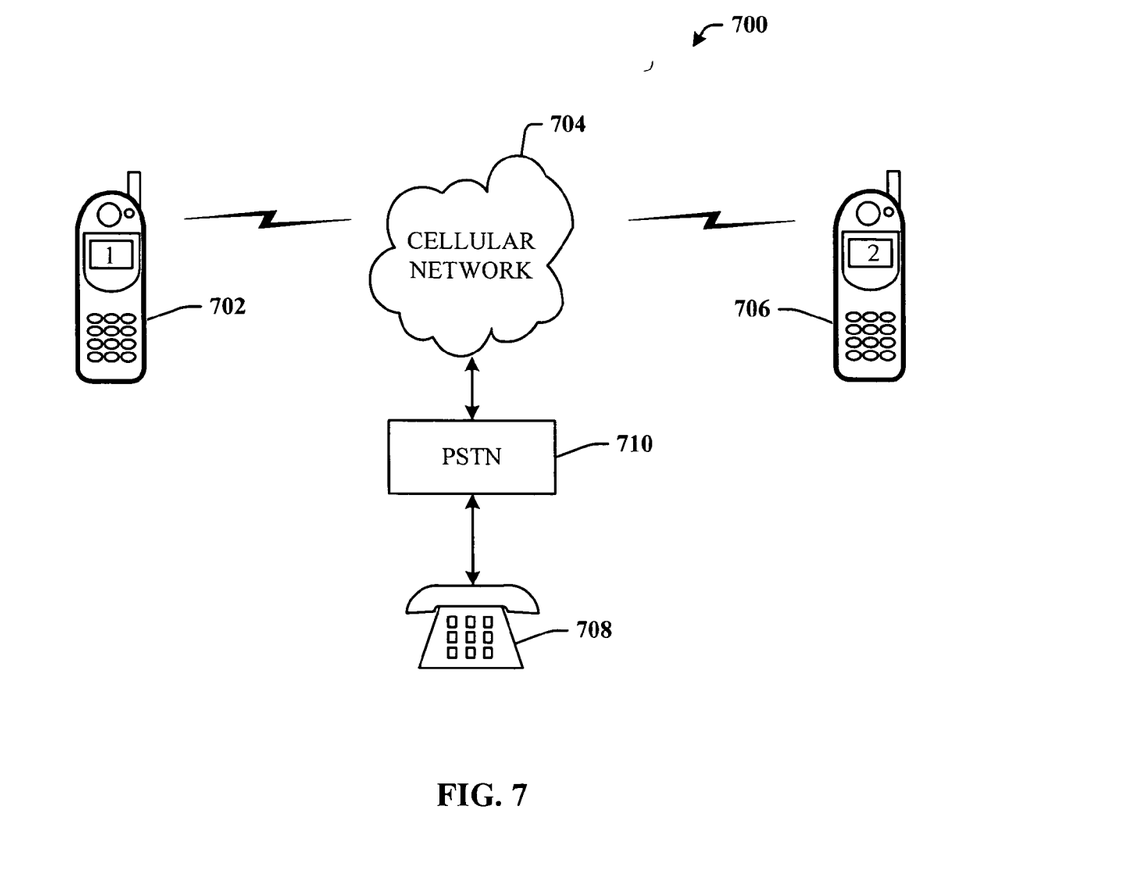
FIG. 7 illustrates a block diagram of a system where the feedback architecture of the subject invention can be employed in a wireless and wired telephone system to facilitate initiation of the feedback signal.

Referring now to FIG. 7, there is illustrated a block diagram of a system 700 where the feedback architecture of the subject invention can be employed in a wireless and wired telephone system to facilitate initiation of the feedback signal. In one implementation, a first wireless user device 702 communicates across a cellular network 704 to a second wireless user device 706. During the call, either or both users of the device (702 and 706) can initiate the user feedback signal in response to perceiving reduced voice quality.

Additionally, the first wireless user device 702 can be used to communicate with a third wired user device 708 via the cellular network 704 and a PSTN (Public Switch Telephone Network) 710. Again, either or both of the first wireless user and the third wired user can initiate the quality feedback signal in response to perceiving reduced voice quality.

In yet another implementation of a multiparty scenario, a conference call can be established such that the first user of the first wireless device 702, the second user of the second wireless device 706, and the third user of the third wired device 708 can communicate to one another during a conference call. In such a scenario, any of the three parties (even more parties are within contemplation of the multiparty scenario) can initiate the quality feedback signal. For example, if the first wireless user initiates the feedback signal, the network can collect information related to each of the three parties.

With respect to hole coverage or lack thereof, when the network determines that only two of the parties are operating wirelessly, as indicated by device information transmitted when the call communication link is established, for example, the amount and type of related information that is collected for analysis can be different than the information collected for the third wired user. If the third user initiated the feedback signal via the third wired device 708, the voice quality may have nothing to do with cellular hole coverage, but more with hardwire line interruptions or problems local to the wired user. In any case, the architecture of the subject invention can be employed such that the user of a wired and/or wireless communications device can access the components necessary for initiating a user feedback signal when he or she perceives reduced signal quality during a telephone conversation.

As indicated previously, where messaging-centric devices are concerned, if a user to a multiparty messaging scenario perceives that text is being received garbled, he or she can initiate a quality feedback signal that is then transmitted during the active messaging communication which is received and processed (similar to the voice call) to indicate that a wireless messaging user who is moving through a cell hole can also provide feedback to the network.

Figure 8:
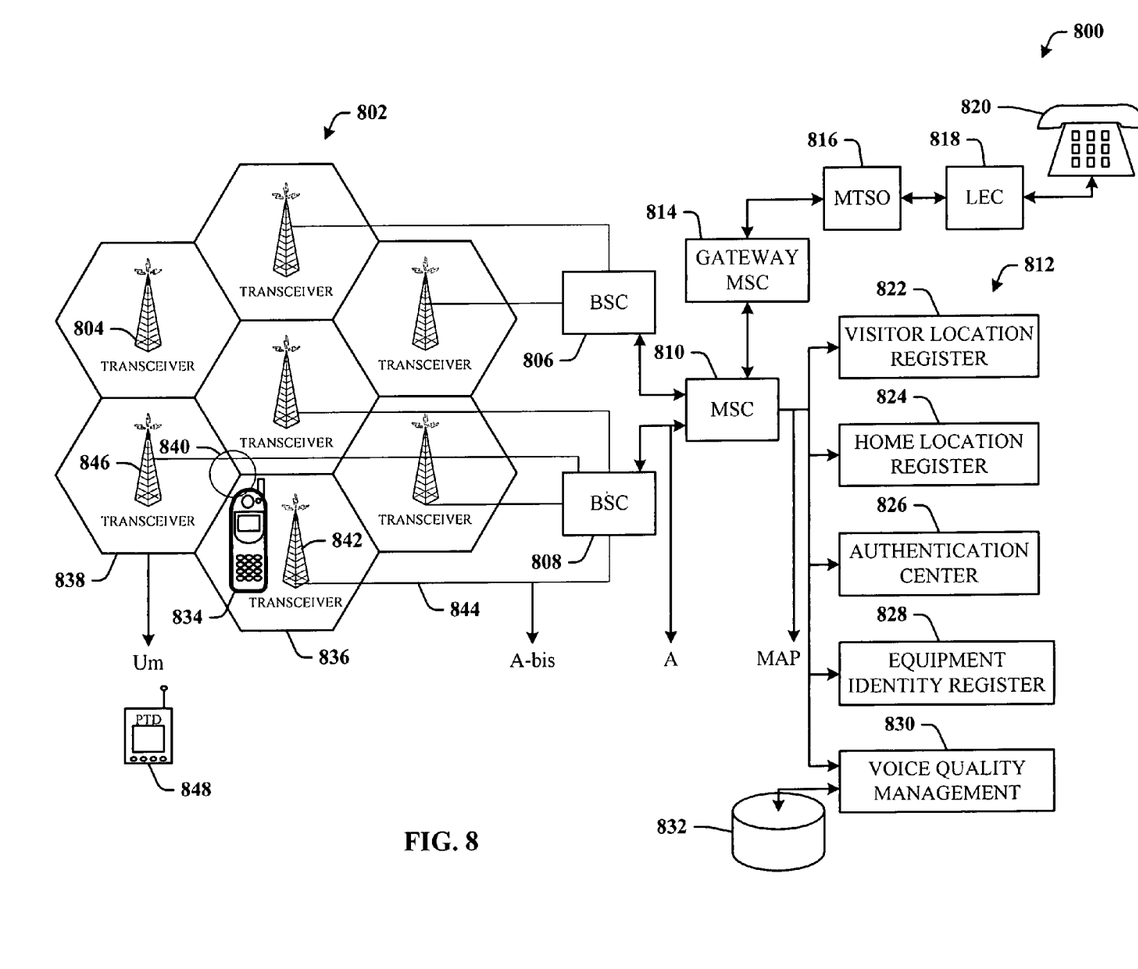
FIG. 8 illustrates a block diagram of a digital cellular system that facilitates the processing of a feedback signal in accordance with the present invention.

Referring now to FIG. 8, there is illustrated a block diagram of a digital cellular system 800 that facilitates the processing of a feedback signal in accordance with the present invention. The system 800 includes a number of cells (or cell sites) 802 each of which is serviced by its own BTS 804. Since there are a number of cells and BTS's, one or more BSC's (806 and 808) are employed to control groups of the BTS's 804. The BSC's (806 and 808) feed into a mobile switching center (MSC) 810 that interfaces to a group of database management systems 812 that enable roaming, billing, interconnection, and signal quality management in accordance with the invention.

The MSC 810 interfaces to a MSC gateway 814 that facilitates the transmission of user device information and signal quality information (e.g., voice). The gateway MSC 814 interfaces to an MTSO (Mobile Telephone Switching Office) 816, which further interfaces to a LEC 818 to complete a communication link to a wired telephone 820. It is to be appreciated that the MTSO 816 and LEC 818 form parts of a PSTN. The PSTN is described as a robust set of communication software and hardware that supports multimedia communications as understood by one skilled in the art.

The disclosed invention is not limited to GSM/GPRS (General Packet Radio Service) technologies, but can be implemented with any current and future technologies. For example, with respect to WCDMA (Wideband Code Division Multiple Access, another name for UMTS—Universal Mobile Telecommunications System) 3G technologies, the BTS is called "Node B" and the BSC is called RNC. However, there are major functionality differences, none of which impact implementation of the present invention.

The database systems 812 include, but are not limited to, a visitor location register (VLR) 822 that stores information about calls being made by roaming subscribers and periodically forwards information to the subscriber's home service providers for billing and other purposes. Each MSC 810 can have a visitor location register database. A home location register (HLR) 824 provides information about subscribers in a particular switching center-controlled area. An authentication center database 826 protects the subscriber from unauthorized access, provides security features including encryption, customer identification, etc., and is associated with the HLR 824. The HLR 824 also stores signature information of a subscriber. Cell ID information related to one or more of the cells 802 can be stored in the MSC 810, and retrieved as needed in accordance with the architecture of the present invention. It is also within contemplation of the subject invention that the subscriber identity information (or customer information) is contained in the DTMF signal, or the MSC 810 can determine the subscriber's identity information from the trunk in which the DTMF signal was transmitted.

An equipment identity register (EIR) 828 registers the mobile equipment types and maintains a database of equipment that has been stolen or blacklisted for some reason. A voice quality management system 830 facilitates execution of a network measurement system to perform measurements of a number of different network parameters and user device parameters. The voice management system 830 interfaces to a data store 832, which maintains the data collected in response to a quality feedback signal. This stored data can then be retrieved, processed, and analyzed to determine the potential cause of the link signal quality degradation.

In operation, once a user moves a portable wireless device 834 (e.g., a cellular telephone, a voice-capable PDA, or messaging centric device) from a cell 836 to a cell 838 towards a hole 840 (represented generally as a circle) in cell coverage, the signal transmitted via a BTS 842 to the device 834 begins to degrade. Note that the hole 840 need not occur at the intersection of the cells (e.g., 836 and 838), but can also occur in a single cell (e.g., 836) due to geographic impediments such as mountains, where satellite systems are not employed, or other major obstructions to signal transmission. At some point, if moving from cell 836 to cell 838 during the conversation, the user will decide to initiate the user feedback signal via the device 834. Of course, the user need not be moving at all, but can experience signal fade or degradation due to other reasons, such as equipment failure, for example.

Once initiated, the feedback signal is transmitted via the BTS 842 across a communication path 844 to the BSC 808 and the MSC 810 to the voice management system 830. The voice management system 830 initiates a data collection procedure that measures data according to the processes described hereinabove. Measurements described previously include the time of the feedback signal and the approximate geographic location of the device 834.

It is to be appreciated that if the user device 834 is moving, the user feedback signal might not be transmitted due to failure of the communication link to the BTS 842 of the cell 836. In such a scenario, once the user device 834 determines that the attempted transmission of the feedback signal failed, it will store the feedback signal data locally until the communication link is reestablished with a BTS 846 in the cell 838. Once the link is reestablished through BTS 846, the feedback signal will immediately (or at some later point in time) be transmitted through BTS 846 to the BSC 808 and MSC 810 to the voice management system 830, to commence collecting the data.

Note that in an alternative implementation, the voice management system 830 can be programmed to periodically and automatically initiate data collection without receipt of the user feedback signal. This capability addresses at least the following situations: the user device 834 is incapable of transmitting the feedback signal due to a device failure (yet the occurrence of the signal is stored onboard the device 834 a non-volatile memory), a communications dropout occurs as the device 834 moves through cell holes thereby preventing transmission of the signal, or the device 834 is preconfigured to transmit the feedback signal at a predetermined time after the feedback signal was initiated. In the latter case, if the communications link is still down, the device 834 can continue to periodically attempt to transmit the feedback signal until such time as the link is re-established and the feedback signal is transmitted.

In any case, the idea is that if the voice management system 830 is programmed on a scheduled basis to measure system parameters (e.g., every 20 minutes), once the feedback signal can be communicated and received at the system 830 for processing, the measured data stored on the system 830 that most corresponds in time to when the feedback signal was initiated, can be retrieved and analyzed for the cause of the signal degradation.

For example, given that at a time zero, the voice management system 830 is programmed to automatically measure and store a number of system parameters every five minutes (zero+5, zero+10, zero+15, etc.), the voice management system 830 would then store a first set of parameters at 5 minutes, a second set at 10 minutes, a third set at 15 minutes, etc. If signal degradation or a communications dropout resulting from movement of the user device 834 from cell 836 to cell 838 through or near the hole 840 occurred at zero+4.5 minutes, the cause of the problem can be analyzed by processing the stored parameters most closely associated in time (i.e., the first set of data measured and recorded at zero+5 minutes).

Similarly, if the user initiates the feedback signal at zero+13.5 minutes due to signal degradation, the user device 834 does not need to communicate the feedback signal to the management system 830 in real-time, but can transmit the feedback signal at later time, if desired. Eventually, the device 834 transmits the feedback signal along with time information (which time information indicates the time at which the signal was initiated) back to the management system 830, which then reads the time information, retrieves the set of data from the management system data store 832 most closely related in time (i.e., the third set of parameters), processes the data, and attempts to resolve the problem accordingly.

It may be that the degraded signal or lost link was experienced at a time when no regularly scheduled parameters that were stored can be used to identify the problem. For example, if the parameters were scheduled to be measured every four hours, it may be counterproductive to use the stored parameter data where the feedback signal was initiated two hours thereafter, as the parameters used for analyzing the problem would be two hours old. However, this can be a tradeoff a system administrator needs to consider when determining the scheduling for regularly measuring and storing system parameters.

In a reverse scenario, as described generally above, if the user of the mobile device 834 is conversing (or messaging) with a user of the wired telephone 820, the user of the wired telephone 820 can initiate the user feedback signal as the mobile user of the device 834 is moving through a group of cells that are part of the cells 802.

Generally, the system 800 operates to detect a cell ID of the cell 836, for example, and use the cell ID to send instructions to the device/subscriber for taking measurements. When the MSC 810 detects the DTMF tone, the MSC 810 knows via which voice channel the feedback signal was transmitted. The MSC 810 can also determine which voice channel is allotted for which subscriber and ascertain the identity of the subscriber/device. It is possible for the MSC 810 to determine other attributes (e.g., device capability, software version, and subscription type) about the subscriber by querying the HLR 824 using subscriber information. The device 834 (e.g., a cellular telephone) also can send the subscriber information and cell ID (associated with cell 836, in this example) of the subscriber's location to the MSC 810 in the feedback signal. Once the MSC 810 determines the cell ID of the cell 836 and the subscriber identity, it can instruct the device 834 to take appropriate measurements on the RF conditions, device settings, etc. This instruction can be passed on from the MSC 810 to the BSC 808 to the BTS 842, and then transmitted over the air. Information sent over the airlink can be via BCCH (Broadcast Control CHannel) or through other control/signaling channels. It can also be sent through the voice channel if the voice channel is active. The BCCH link 844 is a logical channel used in cellular networks to broadcast signaling and control information to all mobile phones within the network.

The system 800 also supports interfacing any cell BTS, for example, of the cell 838 to a GSM network (not shown), as indicated by the air interface symbology Um to a GSM terminal 848. The BSC 808 can interface to a transceiver of the GSM network via the interface denoted as A-bis. The MSC 810 can interface to a base station system/subsystem of the GSM network via an A interface. A MAP (Mobile Application Part) output, which is a user part of the SS7 (Signaling System 7) protocol is used in wireless mobile telephony. MAP standards address roaming and intersystem hand-off procedures. MAP is a query-response procedure that makes use of TCAP (Transaction Capabilities Application Part) over the SS7 network.

Figure 9:
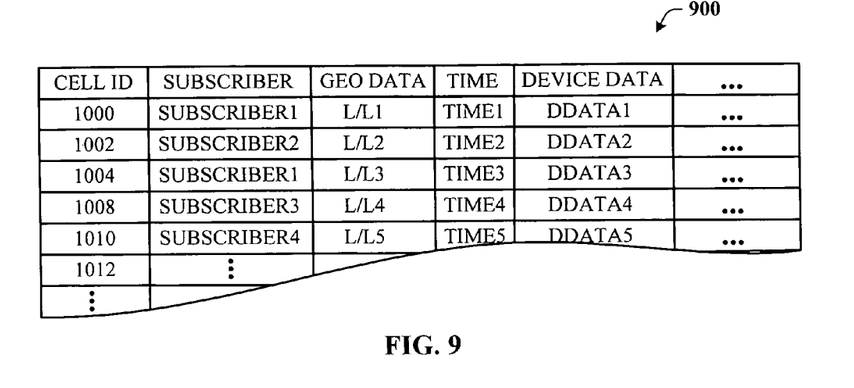
FIG. 9 illustrates portions of a sample database of the data that can be collected by the voice quality management system in accordance with the invention.

Referring now to FIG. 9, there are illustrated portions of a sample database 900 of the data that can be collected by the voice quality management system in accordance with the invention. The database 900 includes at least a cell ID column, a subscriber column, a geographical data column (denoted L/Lx for longitude/latitude), a time column, and a device data column. Other information can be collected and stored as desired, e.g., caller number, called number for a first called destination, called number for a second called destination, and so on.

Figure 10:
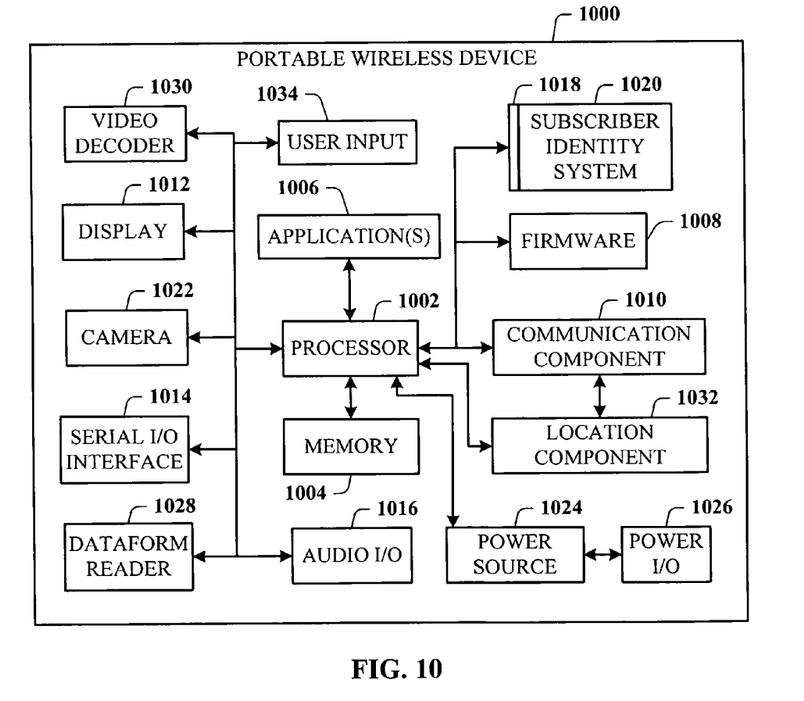
FIG. 10 illustrates a block diagram of the portable wireless device operable to facilitate user feedback signaling in accordance with the subject invention.

Referring now to FIG. 10, there is illustrated a block diagram of the portable wireless device (PWD) 1000 operable to facilitate user feedback signaling in accordance with the subject invention. The PWD 1000 includes a processor 1002 for controlling and processing all onboard operations and functions. A memory 1004 interfaces to the processor 1002 for temporary storage of data and one or more applications 1006 (e.g., a video player software, user feedback component software, etc.). Other applications can include voice recognition of predetermined voice commands that facilitate initiation of the user feedback signal. The applications 1006 can be stored in the memory 1004 and/or in a firmware 1008, and executed by the processor 1002 from either or both the memory 1004 or/and the firmware 1008. The firmware 1008 also stores startup code for execution in initializing the PWD 1000. A communication component 1010 interfaces to the processor 1002 to facilitate wired/wireless communication with external systems, e.g., cellular networks, VoIP networks, and so on.

The PWD 1000 includes a display 1012 for displaying text, images, video, telephony functions (e.g., a Caller ID function), setup functions, and for user input. The display 1012 can also accommodate the presentation of multimedia content. A serial I/O interface 1014 is provided in communication with the processor 1002 to facilitate serial communication (e.g., USB, and/or IEEE 1394) via a hardwire connection, and other serial input devices (e.g., a keyboard, keypad, and mouse). This supports updating and troubleshooting the PWD 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals via a microphone to record data and/or telephony voice data, and for inputting voice signals for telephone conversations.

The PWD 1000 includes a slot interface 1018 for accommodating a SIC (Subscriber Identity Component) in the form factor of a card Subscriber Identity Module (SIM) 1020, and interfacing the SIM card 1020 with the processor 1002. However, it is to be appreciated that the SIM card 1020 can be manufactured into the PWD 1000, and updated by downloading data and software thereinto.

The PWD 1000 can process IP data traffic via the communication component 1010 to accommodate IP traffic from an IP network such as, for example, the Internet, a corporate intranet, a home network, a person area network, etc., via an ISP or cable provider. Thus, VoIP traffic can be utilized by the PWD 1000, and IP-based multimedia content can be received in either an encoded or a decoded format.

A video processing component 1022 (e.g., a camera) can be provided for decoding encoded multimedia content. The PWD 1000 also includes a power source 1024 in the form of batteries and/or an AC power subsystem, which power source 1024 interfaces to an external power system or charging equipment (not shown) via a power I/O component 1026.

The PWD 1000 can also include a dataform reader 1028 suitably designed to read many types of dataforms. For example, the reader 1028 can scan product bar codes of two and three dimensions, and other types of indicia.

The PWD 1000 can also include a video decoder component 1030 for processing video content received and transmitted. A location tracking component 1032 facilitates geographically locating the PWD 1000. As described hereinabove, this can occur when the user initiates the feedback signal automatically or manually.

A user input component 1034 facilitates the user initiating the quality feedback signal. The input component can include such conventional input device technologies such as a keypad, keyboard, mouse, stylus pen, and touch screen, for example.

The disclosed invention finds application to EDGE (Enhanced Data rates for GSM Evolution) technology. EDGE is effectively the final stage in the evolution of the GSM standard, and uses a new modulation schema to enable theoretical data speeds of up to 384 Kbps within the existing GSM spectrum. EDGE is an alternative upgrade path towards 3G services for operators, without access to a new spectrum.

The architecture of the invention also finds application to a hierarchical cell structure (HCS). HCS is the architecture of a multi-layered cellular network where subscribers are handed over from a macrocell to a microcell, and even further, to a picocell, depending on the current network capacity and the needs of the subscriber.

Figure 11:
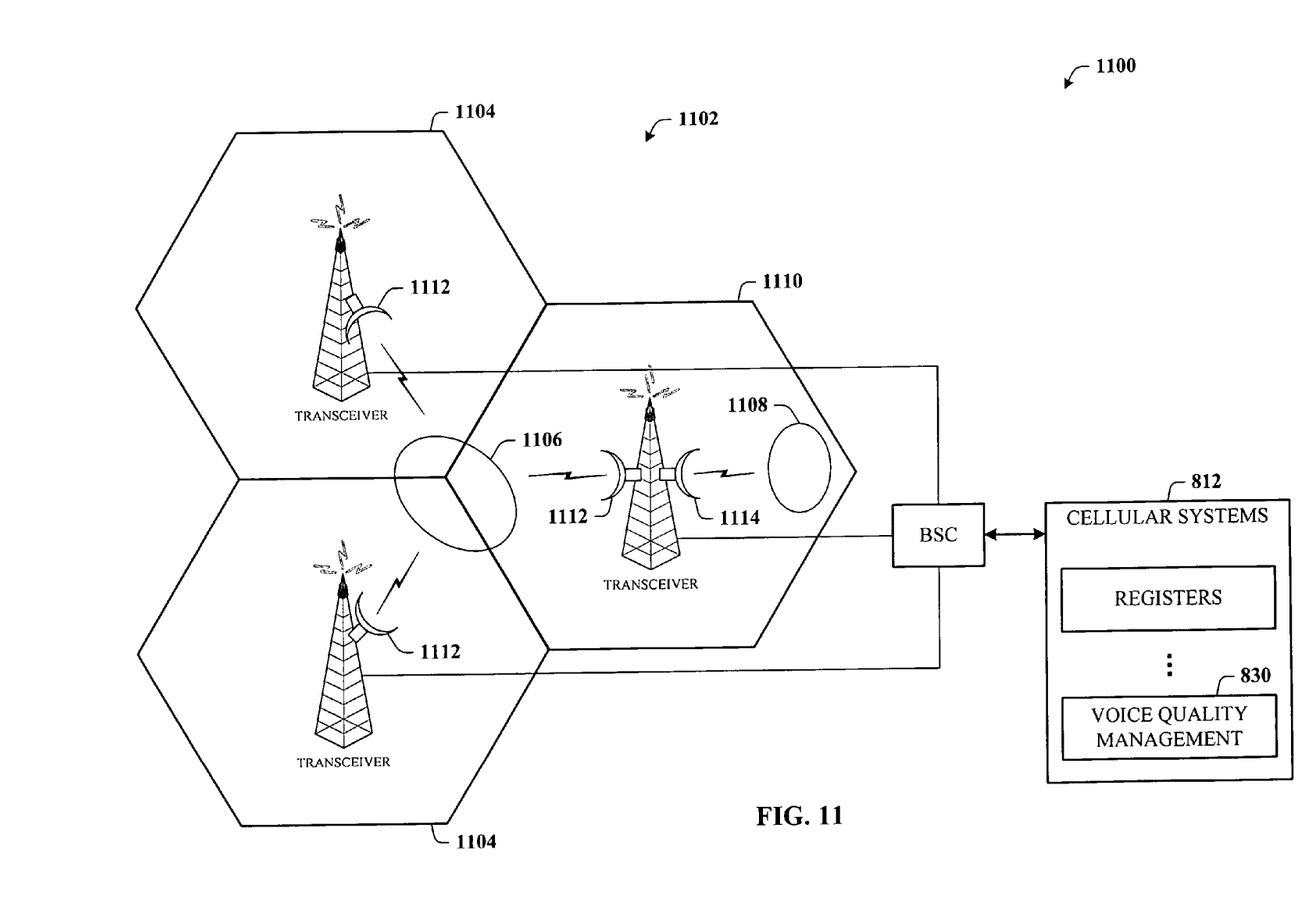
FIG. 11 illustrates a cellular system that automatically determines and corrects for a hole in coverage in accordance with the present invention.

Referring now to FIG. 11, there is illustrated a cellular system that automatically determines and corrects for a hole in coverage in accordance with the present invention. As previously indicated, when a party to a call, e.g., the roaming caller, initiates the quality feedback signal from their cellular phone, one or more network systems perform a number of measurements. One measurement is the geographic location of the caller device. This provides location information to the cellular network as to the location of the user device when the coverage was determined sufficiently weak to affect the quality of the voice signals. As more callers provide the feedback signal when in the vicinity of the hole area, the size and dimensions of the hole can be defined more accurately. A sufficient number of these location information data points can provide definition as to the coverage hole. Moreover, after receiving an increasing number of feedback signals for a given area, the cellular provider can boost the signal coverage for that area to provide better service.

In operation, a partial cell structure 1102 is provided that includes three cells 1104 which together or individually exhibit one or more coverage holes: a first hole 1106 and a second hole 1108. The first hole 1106 can normally be attributed to the limited or weaker coverage that can exist at the interface of two or more of the cells 1104, and which can also be attributed to by natural and/or manmade obstructions. The second hole 1108 can occur within a cell 1110 due to natural and/or manmade structures. Thus, as more quality feedback signals are received in the vicinity of the first hole 1106, as processed through the BSC 808 to the voice quality management system 830 of the database management systems 812, the cellular provider can choose to resolve the coverage problem by provisioning more equipment and/or boosting the signal strength for a given cell 1110 (or either of the cells 1104) or all the cells (1104 and 1110), for example, in the area of the first hole 1106.

In an alternative implementation, directional antennas 1112 can be provided on or near the transceiver stations (BTS's) to facilitate directional signal coverage of a coverage hole. For example, where the first hole 1106 has been accurately defined, the cellular provider can provision any or all of the directional antennas 1112 to point to the hole area to provide better coverage for a user who travels through that area. This provisioning and controlling of the directional antennas 1112 can be performed automatically (by remote control) and/or manually in response to analysis of the data measured and stored in the voice management system 830.

With respect to the second hole 1108, when the network receives a feedback signal from a user in or near the hole 1108, a directional antenna 1114 can be provisioned and remotely controlled to supplement communications in that general area to reduce coverage problems proximate that hole area 1108.

It is to be appreciated that where a user has indicated by the feedback signal reduced voice quality, or reduced services of any kind, the cellular provider accounting system can credit the user account accordingly, based on the measure data, such as the loss of voice quality for a period of time.

It is also to be appreciated that when the user begins to experience reduced signal quality and initiates the feedback signal, the user device can then drop off (or disconnect from) the link entirely. The fact that the user device drops off entirely can be used as feedback to the network that coverage is reduced at the approximate location of the user device, as determined by the measured longitude and latitude.

The feedback signal can also be generated and transmitted (whether intentionally or accidentally) when the integrity of the communications link is acceptable. In such a case, the network can make the measurements and through analysis, decide that the data should or should not be stored, since storing the data would occupy storage space on the voice management system.

Aspects of the invention described above may be stored or distributed on computer-readable media, including magnetic and optically readable and removable distributions, e.g., computer discs and flash memory (e.g., in the form of SIM cards), as well as distributed electronically over the Internet or over other networks (including wireless networks). Those skilled in the relevant art will recognize that portions or embodiments of the invention may reside in a fixed element of a communication network, while corresponding portions may reside on a mobile communication device. Data structures and transmission of data particular to aspects of the invention are also encompassed within the scope of the invention.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

A portable communications device typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Storage media includes both volatile and nonvolatile, removable and non-removable media implemented in any method or technology for storage of information such as computer readable instructions, data structures, program modules or other data. Storage media includes, but is not limited to, RAM, ROM, EEPROM, flash memory or other memory technology, or any other medium which can be used to store the desired information and which can be accessed by the processes on the portable device.

What has been described above includes examples of the invention. It is, of course, not possible to describe every conceivable combination of components or methodologies for purposes of describing the present invention, but one of ordinary skill in the art may recognize that many further combinations and permutations of the subject invention are possible. For example, the disclosed invention can be provided in any wireless device or card such as a PDA, and a wireless air card. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates management of audio signal quality of a communications link, comprising:
   a communications component that facilitates communication over the communications link;
   a feedback component that facilitates generation of a user feedback signal when the communications link is active;
   a user input component which receives user input that initiates generation of the user feedback signal upon detection of voice quality degradation; and
   a location tracking component that facilitates determining a geographic location of the origin of the user feedback signal.

2. The system of claim 1, wherein the audio signal is a voice signal transmitted over the communications link, which is a telephone call.

3. The system of claim 1, wherein the communications link is established between a wireless telephone and a wired telephone.

4. The system of claim 1, wherein the communications link is established between at least two cellular telephones.

5. The system of claim 1, the user input component includes a keypad which facilitates manual generation of the user feedback signal, which user feedback signal is a DTMF (Dual-Tone Multi-Frequency) signal.

6. The system of claim 1, wherein the user input is a voice signal that initiates generation of the user feedback signal.

7. The system of claim 1, wherein the user feedback signal is a DTMF signal that is generated by a party to the communications link.

8. The system of claim 1, wherein in response to generation of the user feedback signal, one or more parameters of a communications system are measured and recorded.

9. The system of claim 8, wherein the one or more parameters include at least one of: a cell site identification, a calling telephone number, a called telephone number, or a current time.

10. The system of claim 8, wherein the one or more parameters include at least one of: a signal strength value, a bit-error rate (BER), a type of codec employed, or number of codec conversions.

11. The system of claim 8, wherein the one or more parameters include at least one of: packet loss data, local exchange carrier (LEC) information, competitive LEC (CLEC) information, incumbent LEC (ILEC) information, or long distance (LD) carrier information.

12. The system of claim 8, wherein the one or more parameters include a device type of a wireless communications device of a party to the communications link, which link is a telephone call.

13. The system of claim 8, wherein the one or more parameters include load information of a cell site when the communications link is active.

14. The system of claim 1, wherein in response to generation of the user feedback signal, a communications system that facilitates the communications link provisions additional communications equipment.

15. The system of claim 1, wherein in response to generation of the user feedback signal, a communications system that facilitates the communications link adjusts signal strength of the communications link.

16. The system of claim 1, wherein the feedback component automatically generates the user feedback signal in response to detection of a degraded voice signal.

17. The system of claim 1, wherein a location tracking component includes a Global Positioning System (GPS) component to facilitate determining the geographic location of the origin of the feedback signal.

18. A method for facilitating user feedback of voice quality of a communication system, the method comprising:
 establishing an active communications link with a mobile communication device;
 generating a feedback signal from the mobile communication device when a user indicates degradation of signal quality over the link;
 receiving the feedback signal to begin analysis of the communication system parameters;
 retrieving a geographic origin of the feedback signal from the mobile communication device;
 measuring the communication system parameters associated with the geographic origin of the feedback signal;
 storing the measured parameters associated with the geographic origin of the feedback signal; and
 processing the stored parameters to improve the communication system performance.

19. The method of claim 18, the act of processing the stored parameters further includes provisioning additional equipment in response to the processing of the stored parameters.

20. The method of claim 18, the act of processing the stored parameters further includes adjusting the signal strength of the communications link in response to the processing of the stored parameters.

21. The method of claim 18, the signal quality is the voice signal quality of the communication link.

22. The method of claim 18, the signal quality is the messaging signal of the communication link.

23. The method of claim 18, the feedback signal includes at least one of: a voice signal or a DTMF signal.

24. The method of claim 18, further comprising the act of:
 automatically generating a feedback signal from the mobile communication device when a messaging signal on the communication link begins to degrade.

25. The method of claim 18, the act of retrieving further employs Global Positioning System (GPS) functionality to determine the geographic location of the mobile communication device.

26. The method of claim 18 further comprising the act of:
 receiving information of a drop of the mobile communication device from the active link as feedback to begin analysis, the analysis includes, at least in part, the latitude and longitude of mobile communication device when the active link dropped.

27. The method of claim 18, wherein the measured parameters include a signal strength value, a bit-error rate (BER), a type of codec employed, or number of codec conversions.

28. The method of claim 18, wherein the measured parameters include a cell site identification, a calling telephone number, a called telephone number, or a current time.

29. The method of claim 18, wherein the active communication link established is a multiparty conference call, the multiparty conference call having more than two communication devices.

30. The method of claim 29, the act of measuring the communication system parameters includes measuring the parameters of each communication device when a feedback signal is initiated by at least one party to the conference call.

31. A method for processing user feedback in a mobile communications device, the method comprising:
 receiving a feedback signal provided by a user during an active communication link as a trigger that the active communication link is degraded;
 performing measurements of the device associated with the degraded active communication link, the measurements include the location of the device, temporal information related to the receipt of the feedback signal, and device parameters;
 storing the measurements on the device; and
 transmitting the measurements for processing to a network system associated with the active communication link.

32. The method of claim 31, wherein the active communication link includes at least one of: a voice signal or a messaging signal.

33. The method of claim 31, wherein the location of the device includes the latitude and longitude of the device.

34. The method of claim 31, wherein the temporal information related to the receipt of the signal includes the time that the feedback signal was provided by the user.

* * * * *